United States Patent Office 2,731,409
Patented Jan. 17, 1956

2,731,409

PHOTOCHEMICAL PRODUCTION OF BENZENE HEXACHLORIDE

Bernard H. Nicolaisen, Lewiston, N. Y., assignor to Olin Mathieson Chemical Corporation, a corporation of Virginia No Drawing. Application August 1, 1951,
Serial No. 239,843

6 Claims. (Cl. 204—163)

My invention relates to an improvement in the process of manufacturing benzene hexachloride and in particular to increasing the proportion of gamma isomer in the final benzene hexachloride product by the use of particular promoters.

Benzene hexachloride is produced by contacting benzene and chlorine under conditions which favor the addition of the chlorine to the benzene ring to the exclusion of chlorine substitution products of benzene. In a typical process chlorine and benzene are introduced into an absorber where the chlorine is dissolved in the benzene. The solution is then passed to a reactor where the solution of chlorine in benzene is subjected to the catalyzing action of light to complete the addition reaction to form benzene hexachloride. The reacted mixture is passed from the reactor to benzene hexachloride product recovery where unreacted benzene is removed from the benzene hexachloride product by distillation, and the recovered benzene is recycled to the absorber.

The benzene hexachloride product produced by the addition reaction between chlorine and benzene contains a mixture of benzene hexachloride isomers. This mixture of isomers consists predominately of the alpha isomer with some beta and gamma isomer and minor amounts of other isomers. Such a mixture of benzene hexachloride isomers is useful as an insecticide. However, because the gamma isomer imparts the insecticidal activity to the mixture of isomers, the other isomers of benzene hexachloride having little or no insecticidal activity as compared with the gamma isomer, the gamma isomer is often separated from the mixture of isomers for use as an insecticide while the remaining isomers are used as intermediates in the production of other organic materials. In either event, whether the mixture of benzene hexachloride isomers is used as an insecticide as such or whether the gamma isomer is separated from the other isomers for individual use as an insecticide, it is commercially desirable to obtain as large a proportion as possible of the gamma isomer in the mixture of isomers formed in the production of benzene hexachloride.

I have discovered that the amount of gamma isomer in a benzene hexachloride product produced by conventional processes is increased as much as 8 to 12 per cent or more by incorporating in the reaction mixture of chlorine and benzene an oxychloride of sulfur. The increase in amount of gamma isomer obtained through the use of a sulfur oxychloride promoter is accomplished without altering any of the conventional operating conditions.

I am unable to explain the increase in gamma isomer content produced by the use of a sulfur oxychloride promoter. I do not know whether the increase is due to a catalytic promotion of the gamma isomer content or whether the sulfur oxychloride promoter acts to inhibit gamma isomer deterioration.

In experimental tests in the absence of known catalysts, i. e. catalysts other than the catalyzing light employed, I have found the proportion of gamma isomer obtained by the conventional processes for the manufacture of benzene hexachloride to be about 12 per cent. By introducing a sulfur oxychloride promoter into the reaction mixture, the proportion of gamma isomer is increased to about 13 per cent. All the percentages of gamma isomer cited herein are based on infra-red analysis. While higher proportions of gamma isomer have been reported elsewhere, they have been based on other methods of analysis and, therefore, the comparisons reported here are not comparable with values reported in the literature and obtained by a variety of other methods.

The use of a sulfur oxychloride promoter does not give a quantitatively uniform gamma isomer content with all benzenes, but like the benzene hexachloride product obtained without using an added promoter, the gamma isomer content varies slightly depending on the benzene source. However, I have employed benzene from several sources in the production of benzene hexachloride and in every case the use of a sulfur oxychloride promoter produced in the benzene hexachloride product an increased gamma isomer content compared to benzene hexachloride products produced from the same benzene but without the added sulfur oxychloride promoter.

The promoters which I have found useful to obtain an increase in the gamma isomer content of benzene hexachloride are the oxychlorides of sulfur, e. g., thionyl chloride and sulfuryl chloride. Sulfur dioxide, sulfur trioxide and other oxides of sulfur may be used as promoters because in the presence of the chlorine employed in the addition reaction to form the benzene hexachloride they are converted into sulfur oxychlorides.

I have found that the best results are obtained with the use of about 5 weight per cent of an oxychloride of sulfur based on the chlorine introduced into the addition reaction. However, this proportion may vary from 1 to 15 weight per cent or more with satisfactory results. The promoter concentration in the reaction mixture should be maintained above the minimum concentration of about 1 weight per cent based on the chlorine introduced into the addition reaction. The promoter may be partially removed or destroyed in the recovery of the benzene hexachloride product after the addition reaction. Therefore, while a portion of the promoter may be returned to the reaction with the recycled benzene, it will usually be necessary to introduce the promoter continuously in order to maintain the desired promoter concentration in the reaction mixture. Of course, even intermittent introduction of the promoter will increase to some extent the proportion of gamma isomer in the benzene hexachloride product.

The sulfur oxychloride promoters may be introduced into the reaction in any desired manner. I have found it convenient to add them to the stream of chlorine introduced into the benzene. When the chlorine is introduced into the benzene in an initial gaseous state and the particular promoter employed is a liquid, the promoter can be introduced by bubbling the chlorine gas through a body of the liquid promoter at a temperature controlled to introduce the desired proportion of promoter into the stream of chlorine gas. Alternatively, the promoter may be introduced into the reaction with the recycled or fresh benzene or introduced directly into the reaction chamber with equally good results. As stated before, however, I have found it more convenient to utilize the stream of chlorine for the introduction of the promoter.

The following examples will illustrate the improved process of my invention.

Example I

Thionyl chloride was introduced into the chlorine flow at the rate of 0.13 gram per minute. This was 5 weight per cent based on the chlorine introduced. The admixture of promoter and chlorine was passed to an absorber containing benzene introduced both as fresh benzene and as recycled benzene obtained from benzene hexachloride recovery. The solution of chlorine, promoter and benzene passed to an illuminated reaction chamber where the addition reaction between the chlorine and benzene to form benzene hexachloride took place at a temperature maintained at about 51° C. The reacted mixture was then passed to a still where excess benzene and some promoter was removed. The residue was finally steam distilled to remove residual benzene, promoter and by-products. The residual benzene hexachloride, after drying, contained 12.7 percent of gamma isomer.

*Example II*

Sulfur dioxide was added at the rate of 0.3 gram per minute to a flow of chlorine of 2.14 grams per minute using the same apparatus and procedure as in Example I. The residual benzene hexachloride, after steam stripping and drying, contained 12.75 percent of gamma isomer.

*Example III*

Sulfuryl chloride, obtained by passing a mixture of $SO_2$ and chlorine over camphor to catalyze the formation of $SO_2Cl_2$, was introduced into the chlorine flow to the absorber using the apparatus and procedure of Example I. The amount of $SO_2$ was 13 weight percent of the chlorine introduced as such and with the sulfur dioxide. The gamma isomer content of the benzene hexachloride thus produced was 13.18 percent.

*Example IV*

Thionyl chloride was introduced as described in Example I at the rate of 5.0 weight percent of thionyl chloride based on the chlorine introduced to the absorber. The proportion of gamma isomer in the product was 13.0 percent.

*Example V*

Thionyl chloride was introduced as described in Example I at the rate of 17.3 weight percent of thionyl chloride based on $Cl_2$ introduced to the absorber. The proportion of gamma isomer in the product was 13.25 percent.

*Example VI*

A series of pilot plant runs were made in which the apparatus and procedure were similar to Example I and in which the reaction conditions were maintained at approximately the same values except that some runs were made without added sulfur oxychloride promoters and some runs were made with the addition of sulfur oxychloride promoters. The average gamma isomer content of the benzene hexachloride produced in the runs using no promoter was about 11.5 per cent while in those runs in which the sulfur oxychloride promoters were employed, the average gamma isomer content was about 13.0 per cent. Specifically, in five runs using no promoter the following percentages of gamma isomer in the benzene hexachloride product were obtained: 11.7, 11.8, 11.0, 11.5 and 11.5, as compared to a gamma isomer content of 12.7 ($SOCl_2$), 12.8 ($SO_2$), 13.2 ($SO_2Cl_2$), 13.0 ($SOCl_2$) and 13.3 ($SOCl_2$) obtained in the runs using the sulfur oxychloride promoter indicated. In all the above runs, the temperature of the reaction mix leaving the reaction chamber was maintained between about 50° and about 55° C. In the runs using the sulfur oxychloride promoters, the concentration of the catalyst was maintained between about 3 and 15 weight per cent based on the chlorine charged to the addition reaction.

I claim:

1. In the production of benzene hexachloride by contacting liquid benzene and chlorine in the presence of light, the improvement which comprises introducing into the mixture of benzene and chlorine to be reacted a sulfur oxychloride promoter in an amount within the range of about 1 to about 15 weight per cent based on the chlorine introduced.

2. The process of claim 1 in which the amount of sulfur oxychloride promoter introduced is about 5 weight per cent.

3. The process of claim 2 in which the sulfur oxychloride promoter is thionyl chloride.

4. The process of claim 2 in which the sulfur oxychloride promoter is sulfuryl chloride.

5. The process of claim 1 in which the sulfur oxychloride promoter is produced by adding an oxide of sulfur to the mixture of chlorine and benzene.

6. In a process for the production of the gamma isomer of benzene hexachloride by contacting liquid benzene and chlorine in the presence of actinic light, the improvement which comprises introducing sulfur dioxide into the mixture of benzene and chlorine to be reacted, the amount of sulfur dioxide being about 1 per cent by weight based on the chlorine introduced.

References Cited in the file of this patent

UNITED STATES PATENTS

| | | |
|---|---|---|
| 2,046,090 | Reed | June 30, 1936 |
| 2,555,889 | Kolka et al. | June 5, 1951 |

FOREIGN PATENTS

| | | |
|---|---|---|
| 613,519 | Great Britain | Nov. 30, 1948 |